United States Patent
Feng et al.

(10) Patent No.: US 9,167,627 B2
(45) Date of Patent: Oct. 20, 2015

(54) METHOD FOR MAKING HEATER

(71) Applicants: Tsinghua University, Beijing (CN); HON HAI PRECISION INDUSTRY CO., LTD., New Taipei (TW)

(72) Inventors: Chen Feng, Beijing (CN); Xue-Wei Guo, Beijing (CN); Li Qian, Beijing (CN); Yu-Quan Wang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 212 days.

(21) Appl. No.: 13/779,753

(22) Filed: Feb. 28, 2013

(65) Prior Publication Data
US 2013/0284695 A1 Oct. 31, 2013

(30) Foreign Application Priority Data

Apr. 28, 2012 (CN) .......................... 2012 1 0130016

(51) Int. Cl.
| | |
|---|---|
| *H01R 43/00* | (2006.01) |
| *H05K 3/00* | (2006.01) |
| *C03C 15/00* | (2006.01) |
| *C03C 25/68* | (2006.01) |
| *H05B 3/34* | (2006.01) |
| *B32B 37/02* | (2006.01) |
| *B32B 37/12* | (2006.01) |
| *B32B 38/00* | (2006.01) |

(Continued)

(52) U.S. Cl.
CPC *H05B 3/34* (2013.01); *B32B 37/02* (2013.01); *B32B 37/12* (2013.01); *B32B 38/0004* (2013.01); *H05B 3/145* (2013.01); *B32B 2307/202* (2013.01); *B82Y 30/00* (2013.01); *H05B 2203/011* (2013.01); *H05B 2203/017* (2013.01); *H05B 2214/04* (2013.01)

(58) Field of Classification Search
CPC ........... H01L 2924/01079; H01L 2924/01029; B32B 37/02; B32B 37/12; B32B 38/0004
USPC .......................... 29/854, 829; 216/36; 156/85
See application file for complete search history.

(56) References Cited

U.S. PATENT DOCUMENTS

| | | | |
|---|---|---|---|
| 2009/0314765 A1* | 12/2009 | Feng et al. ..................... | 219/520 |
| 2009/0321421 A1* | 12/2009 | Feng et al. ..................... | 219/546 |
| 2010/0000669 A1* | 1/2010 | Feng et al. ..................... | 156/242 |

(Continued)

FOREIGN PATENT DOCUMENTS

| | | |
|---|---|---|
| CN | 101616515 | 12/2009 |
| CN | 101998706 | 3/2011 |

(Continued)

*Primary Examiner* — David Angwin
(74) *Attorney, Agent, or Firm* — Novak Druce Connolly Bove + Quigg LLP

(57) ABSTRACT

A method for making a heater is provided. A support and a flexible substrate are provided. The flexible substrate is fixed on a surface of the support. A carbon nanotube film is drawn from a carbon nanotube array. One end of the carbon nanotube film is attached on the flexible substrate. The carbon nanotube film is wrapped around the support by whirling the support to form a carbon nanotube layer. The carbon nanotube layer includes a plurality of carbon nanotubes aligned in a first direction. The flexible substrate is heated to a temperature of about 80° C. to about 120° C. The flexible substrate is then shrunk along the first direction. A plurality of electrodes are electrically connected with the carbon nanotube layer.

20 Claims, 3 Drawing Sheets

(51) Int. Cl.
  *H05B 3/14*     (2006.01)
  *B82Y 30/00*    (2011.01)

(56) References Cited

U.S. PATENT DOCUMENTS

| | | | |
|---|---|---|---|
| 2010/0122980 A1* | 5/2010 | Wang et al. | 219/553 |
| 2010/0252317 A1* | 10/2010 | Gritters et al. | 174/261 |
| 2011/0036826 A1* | 2/2011 | Feng et al. | 219/409 |
| 2011/0036828 A1* | 2/2011 | Feng et al. | 219/529 |
| 2011/0155295 A1* | 6/2011 | Fan et al. | 156/60 |
| 2011/0265314 A1* | 11/2011 | Brommer et al. | 29/600 |
| 2012/0125914 A1* | 5/2012 | Yue et al. | 219/548 |
| 2013/0146214 A1* | 6/2013 | Qian et al. | 156/185 |
| 2013/0152349 A1* | 6/2013 | Wang et al. | 29/25.01 |
| 2014/0015548 A1* | 1/2014 | Naughton et al. | 324/658 |

FOREIGN PATENT DOCUMENTS

| | | |
|---|---|---|
| CN | 102115071 | 7/2011 |
| TW | 201323326 | 6/2013 |

* cited by examiner

METHOD FOR MAKING HEATER

RELATED APPLICATIONS

This application claims all benefits accruing under 35 U.S.C. §119 from China Patent Application No. 201210130016.5, filed on Apr. 28, 2012, in the China Intellectual Property Office, the disclosure of which is incorporated herein by reference. The application is also related to copending applications entitled, "HEATER," filed on Feb. 28, 2013, with application Ser. No. 13/779,752 and "METHOD FOR MAKING HEATER," filed on Apr. 19, 2013, with application Ser. No. 13/866,232.

BACKGROUND

1. Technical Field

The present disclosure relates to a method for making a heater.

2. Description of Related Art

A typical heater includes a heating element and at least two electrodes. The heating element is electrically connected with the two electrodes. The heating element generates heat when a voltage is applied to it. The heating element is often made of a metal such as tungsten. Metals, which have good conductivity, and can generate a lot of heat even when a low voltage is applied. However, metals can easily oxidize, thus the heater element has a short life. Furthermore, because metals have a relative high density, the heating element made of metals are heavy, which limits applications of such heater.

Therefore there is room for improvement in the art.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
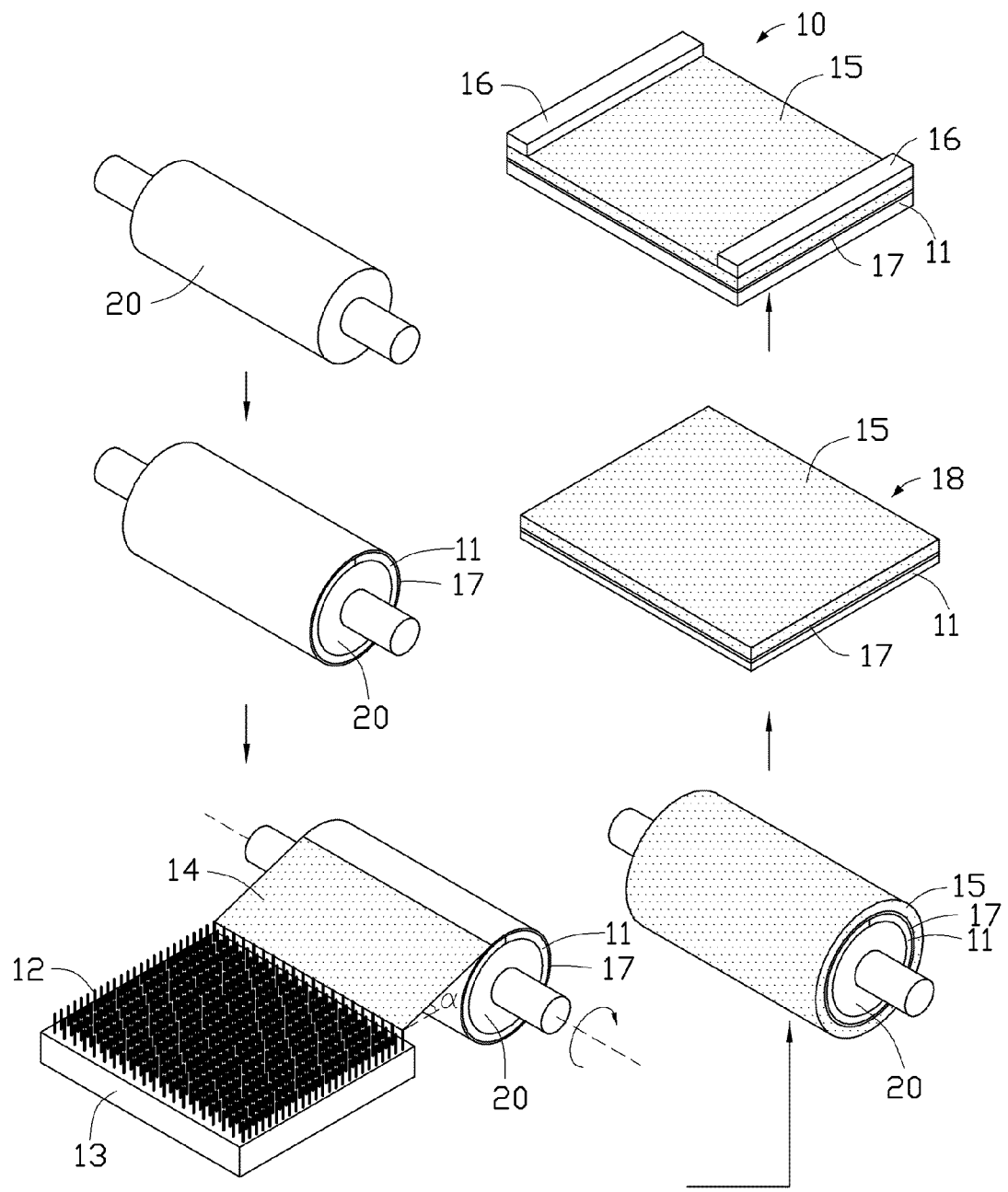
FIG. 1 is a schematic view showing one embodiment of a process of making a heater.
Figure 2:
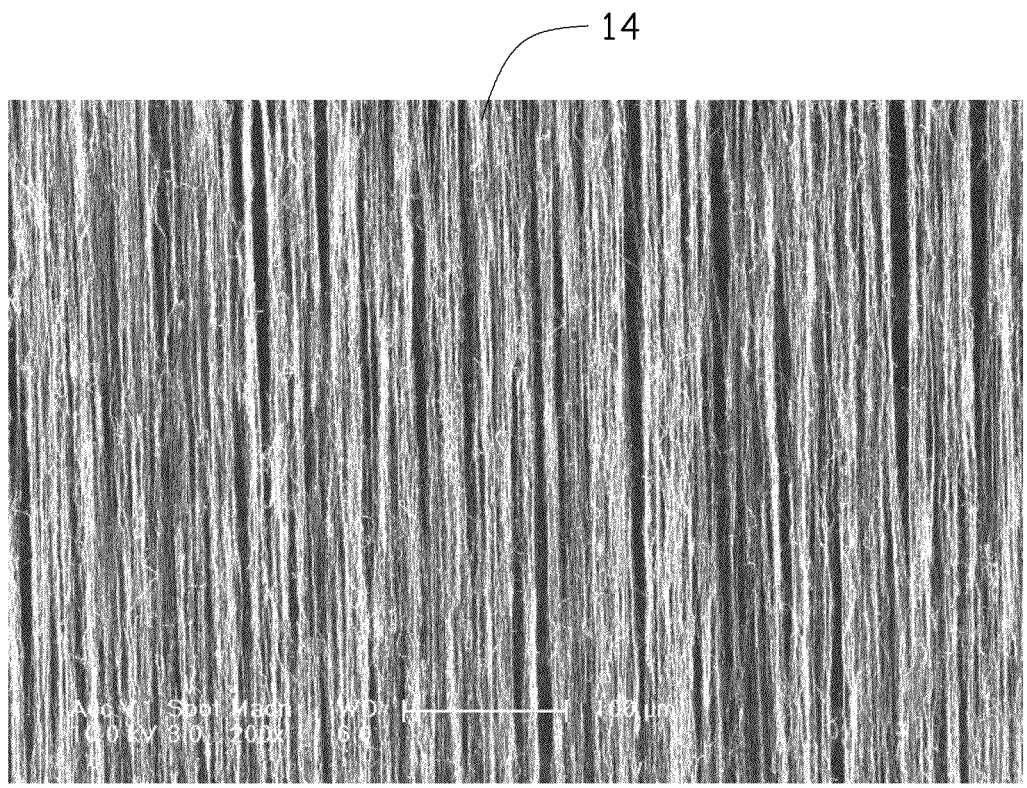
FIG. 2 is a scanning electron microscope (SEM) photo of a carbon nanotube film.
Figure 3:
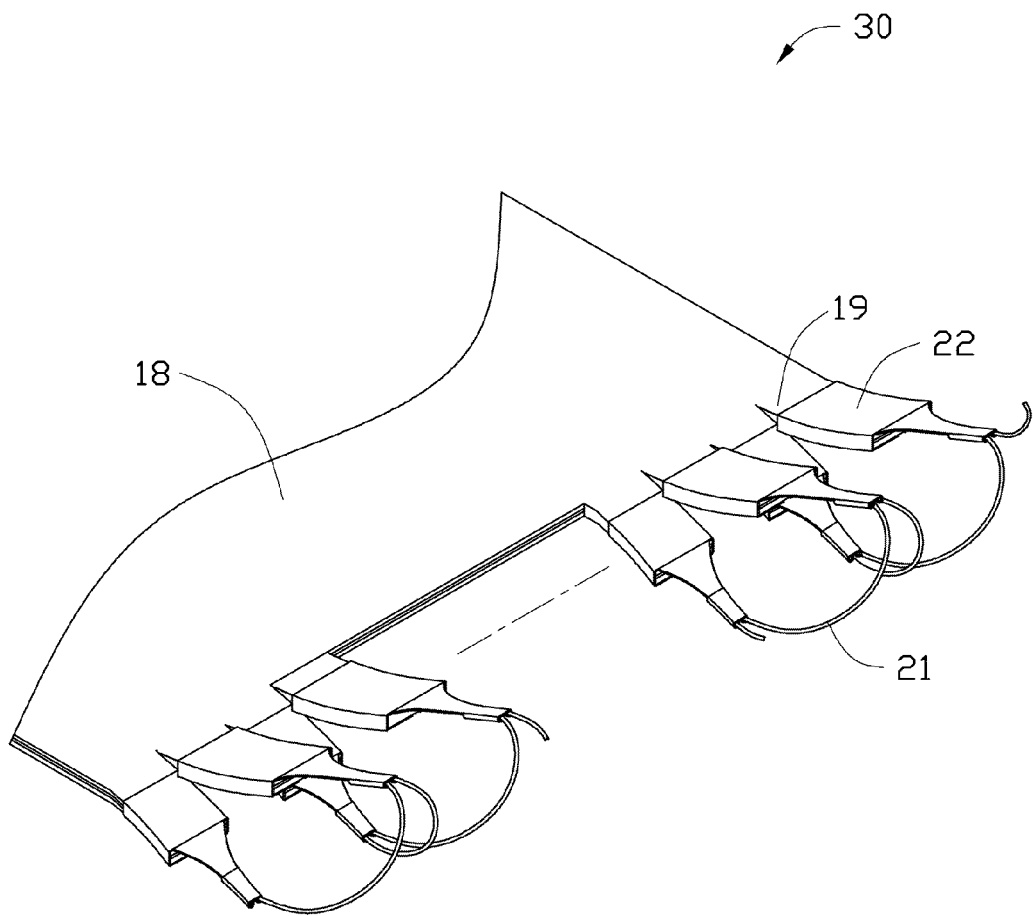
FIG. 3 is a schematic view of one embodiment of the heater.

Referring to FIGS. 1 and 2, an embodiment of a method for making a heater 10 is provided. The method includes the steps of:

S1: providing a support 20 and a flexible substrate 11, and wrapping the flexible substrate 11 on a surface of the support 20;

S2: drawing a carbon nanotube film 14 from a carbon nanotube array 12, and attaching one end of the carbon nanotube film 14 on the flexible substrate 11;

S3: wrapping the carbon nanotube film 14 around the support 20 by rotating the support 20 to form a carbon nanotube layer 15 around the flexible substrate 11;

S4: separating the flexible substrate 11 from the support 20 and the carbon nanotube layer 15, the carbon nanotube layer 15 includes a plurality of carbon nanotubes aligned in a first direction;

S5: shrinking the flexible substrate 11 along the first direction by heating the flexible substrate 11 to a temperature ranging from about 80° C. to about 120° C., and S6: electrically connecting a plurality of electrodes 16 with the carbon nanotube layer 15.

In step S1, the support 20 can have a column structure, a triangular prism structure, or a cuboid structure. In one embodiment according to FIG. 2, the support 20 has a column structure. The support 20 can rotate around its axis, driven by an electric motor. In the embodiment according to FIG. 1, the flexible substrate 11 wraps on a surface of the support 20 to form a cylinder structure. The flexible substrate 11 is a heat-shrinkable material. That is, a size of the heat-shrinkable material can shrink when the heat-shrinkable material is heated to a temperature. The material of the flexible substrate 11 can be acrylonitrile-butadiene-styrene (ABS), ethylene-vinyl acetate copo (EVA), polyethylene terephthalate (PET) or polyolefin. In one embodiment, the material of the flexible substrate 11 is polyolefin. A length of the flexible substrate 11 is about 40 centimeters, and a width of the flexible substrate 11 is about 30 centimeters.

In one embodiment, the step S1 includes sub-steps of:

S11: fixing one end of the flexible substrate 11 on the surface of the support 20; and S12: rotating the support 20 to wrap the flexible substrate 11 around the circumferential surface of the support 20.

After the flexible substrate 11 is wrapped on the support 20, an adhesive layer 17 can be formed on the circumferential surface of the flexible substrate 11. A material of the adhesive layer 17 can be silica gel.

In step S2, the step includes sub-steps of:

S21: providing a carbon nanotube array 12 formed on a separate substrate 13;

S22: pulling out a carbon nanotube film 14 from the carbon nanotube array 12; and S23: attaching one end of the carbon nanotube film 14 on the flexible substrate 11, and the carbon nanotube film 14 is kept stretched between the carbon nanotube array 12 and the flexible substrate 11.

In step S21, the carbon nanotube array 12 includes carbon nanotubes aligned in a same direction. The aligned direction of the carbon nanotubes in the carbon nanotube array is substantially perpendicular to the top surface of the substrate 13.

In step S22, the carbon nanotube film 14 can be pulled out by the steps of:

S221: selecting some carbon nanotubes having a predetermined width from the array of carbon nanotubes; and S222: pulling the carbon nanotubes to obtain nanotube segments at uniform speed to achieve the carbon nanotube film 14.

In step S221, the carbon nanotubes are substantially parallel to each other. The carbon nanotubes can be selected by using an adhesive tape as the tool to contact the carbon nanotubes. In step S222, the pulling direction is substantially perpendicular to the growing direction of the super-aligned array of carbon nanotubes. The carbon nanotube film 14 can be pulled out continuously from the carbon nanotube array 12. The carbon nanotube film includes a plurality of carbon nanotubes joined end to end. The plurality of carbon nanotubes joined end to end means that opposite ends of a carbon nanotube are continuously connected with the ends of two other carbon nanotubes. The plurality of carbon nanotubes are substantially parallel with each other. The plurality of carbon nanotubes in the carbon nanotube film 14 are substantially parallel with a surface of the carbon nanotube film 14. The plurality of carbon nanotubes in the carbon nanotube film 14 are joined with each other by van der Waals attractive force. The plurality of carbon nanotubes in the carbon nanotube 14 can be pure, meaning there is no impurity attached on each carbon nanotube. The carbon nanotube film can consist of the plurality of carbon nanotubes. The carbon nanotube film is a free-standing structure, that is, the carbon nanotube film can be suspended in the air with two ends of the carbon nanotube film 14 fixed without any support between and still maintain its structural integrity.

In step S222, during the pulling process, as the initial carbon nanotubes are drawn out, other carbon nanotubes are also drawn out end to end due to van der Waals attractive force between ends of adjacent segments. This process of pulling produces a substantially continuous and uniform carbon nanotube film having a predetermined width. The width of the carbon nanotube film depends on a size of the carbon nanotube array. The length of the carbon nanotube film can be set as desired. In one embodiment, when the substrate is a 4 inch type wafer, a width of the carbon nanotube film can be in a range from about 1 centimeter (cm) to about 10 cm, the length of the carbon nanotube film can reach about 120 m, and the thickness of the carbon nanotube film can be in an range from about 0.5 nm to about 100 microns.

In step S23, the carbon nanotube film 14 is suspended between the carbon nanotube array 12 and the flexible substrate 11. In one embodiment, the carbon nanotubes in the carbon nanotube film 14 are pure and adhesive, and the carbon nanotube film 14 can be directly attached on the surface of the flexible substrate 11. In another embodiment, the carbon nanotube film 14 is attached on the flexible substrate 11 via the adhesive layer 17. One part of the carbon nanotube film 14 is suspended between the carbon nanotube array 12 and the support 20. The carbon nanotubes in the one part of the carbon nanotube film 14 suspended between the carbon nanotube array and the support 20 are oriented in substantially the same direction substantially perpendicular to an axis of the support 20.

In step S2, after the end of carbon nanotube film 14 is attached on the flexible substrate 11, an angle can be defined between the surface of the carbon nanotube film 14 and the aligned direction of the carbon nanotubes in the carbon nanotube array 12. The carbon nanotubes in the carbon nanotube film 14 are substantially parallel with the surface of the carbon nanotube film 14. The angle can be in a range from about 60 degrees to about 90 degrees. In one embodiment, the angle is about 97 degrees.

In step S3, the support 20 rotates around its axis, and the carbon nanotube film 14 is pulled out continuously from the carbon nanotube array 12 and wraps around the support 20 and a surface of the flexible substrate 11. A rotating speed of the support 20 is less than 15 m/s. In one embodiment, the rotating speed is about 0.5 m/s. The carbon nanotube layer 15 can be formed by winding the carbon nanotube film 14 continuously around the flexible substrate 11. Thus, a plurality of layers of carbon nanotube film 14 can be formed. The carbon nanotube layer 15 includes the plurality of layers of carbon nanotube films 14 joined with each other by van der Waals attractive force. The layers of the carbon nanotube films 14 can be adjusted by changing the rotating rounds of the support 20. In one embodiment, the carbon nanotube layer 15 includes 200 layers of carbon nanotube films 14. The carbon nanotube layer 15 is fixed on the flexible substrate 11 via the adhesive layer 17. A pressing force can be applied on the carbon nanotube layer 15 to fill the adhesive layer 17 into the carbon nanotube layer 15, and the carbon nanotube layer 15 can combine tightly with the flexible substrate 11. In one embodiment, the pressing force is applied by a soft brush (not shown). The soft brush can brush the carbon nanotube layer 15 as the support 20 rotates.

In step S4, the flexible substrate 11 with the carbon nanotube layer 15 is separated from the support 20. The carbon nanotube layer 15 is attached on the surface of the flexible substrate 11. The surface can be a circumferential surface. The carbon nanotube layer 15 is attached on the circumferential surface of the flexible substrate 11. The flexible substrate 11 and the carbon nanotube layer 15 are both wrapped around the support 20 before they are separated from the support 20. The flexible substrate 11 and the carbon nanotube layer 15 are cut along a line which is substantially parallel with the axis of the support 20. Thus, the flexible substrate 11 unfolds to have a planar structure. The carbon nanotube layer 15 is attached on the circumferential surface of the substrate 11. The flexible substrate 11 and the carbon nanotube layer 15 can be cut by a mechanical method or by an etching method. In one embodiment, the flexible substrate 11 and the carbon nanotube layer 15 are cut by a laser.

In step S5, the carbon nanotube layer 15 and the flexible substrate 11 can be heated in a furnace to shrink the flexible substrate 11 along the first direction. After the flexible substrate 11 shrinks along the first direction, the carbon nanotube layer 15 also shrinks along the first direction. Thus, a plurality of wrinkles are formed in the carbon nanotube layer 15. Each of the plurality of wrinkles has a linear structure, and is oriented along a second direction. The second direction is substantially perpendicular with the first direction. The carbon nanotubes in the carbon nanotube layer 15 are oriented along the first direction. In the embodiment disclosed above, the material of flexible substrate 11 is polyolefin. The flexible substrate 11 is heated to about 100° C. The length of the flexible substrate 11 shrinks to 50% of its original length.

In one embodiment, an adhesive layer 17 is applied between the flexible substrate 11 and the carbon nanotube layer 15. After the flexible substrate 11 is separated from the support 20, the flexible substrate 11 with the adhesive lay 17 and the carbon nanotube layer 15 thereon can be put into a solidifying apparatus for about 10 minutes to about 20 minutes.

In step S6, the plurality of electrodes 16 are located on two opposite ends of the flexible substrate 11. The carbon nanotube layer 15 includes a first end and a second end opposite to the first end. The carbon nanotubes in the carbon nanotube layer 15 are substantially oriented from the first end to the second end. The plurality of electrodes 16 are electrically connected with the first end and the second end. The carbon nanotubes in the carbon nanotube layer 15 are substantially oriented from the electrodes 16 electrically connected with the first end to the electrodes 16 electrically connected with the second end. A shape of the electrodes 16 can be a square, a rectangle, linear, or round. The plurality of electrodes 16 are located apart from each other. The plurality of electrodes 16 can be formed by a spraying method, electric plating method, or chemical plating method.

In another embodiment, an organic solvent can be applied on the carbon nanotube layer 15 to soak the carbon nanotube layer 15, after step S6 or before step S6. The organic solvent can be dropped onto the carbon nanotube layer 15. After being soaked by the organic solvent, the adjacent paralleled carbon nanotubes in the carbon nanotube layer 15 will bundle together, due to the surface tension of the organic solvent as the organic solvent volatilizes. The carbon nanotubes in the carbon nanotube layer 15 can combine tightly via van der Waals attractive force. The carbon nanotube layer 15 can also combine with the flexible substrate 11 tightly after being soaked by the organic solvent. The organic solvent can be volatile, such as ethanol, methanol, acetone, dichloromethane, chloroform, or any appropriate mixture thereof.

In another embodiment, step S6 includes sub-steps of:

S61: cutting the first end and the second end of the carbon nanotube layer 15 and the flexible substrate 11 connected with the first end and the second end to form a plurality of linear structures;

S62: providing a plurality of electrodes 22, and each of the plurality of electrodes 22 clips one linear structure and is used as an electrode.

In step S61, each of the linear structure has a width of about 7 millimeters, and a length of about 10 millimeters.

In step S62, in one embodiment, the electrodes 22 have a clamping structure. One linear structure is inserted into the electrode 22 and clamped by the electrode 22. Each of the electrodes 22 adjacent to the first end is electrically connected with a lead 21. A material of the plurality of electrode 22 is conductive. In one embodiment, a resistance between one electrode 22 and the linear structure is about 0.1 Ω.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a heater, the method comprising:
   S1: providing a support and a flexible substrate, wrapping the flexible substrate on a surface of the support;
   S2: drawing a carbon nanotube film from a carbon nanotube array, and attaching one end of the carbon nanotube film on the flexible substrate;
   S3: wrapping the carbon nanotube film around the support by rotating the support to form a carbon nanotube layer around the flexible substrate;
   S4: separating the flexible substrate from the support and the carbon nanotube layer, the carbon nanotube layer includes a plurality of carbon nanotubes aligned in a first direction;
   S5: shrinking the flexible substrate along the first direction by heating the flexible substrate to a temperature ranging from about 80° C. to about 120° C., and
   S6: electrically connecting a plurality of electrodes with the carbon nanotube layer.

2. The method of claim 1, wherein in the step S1, the flexible substrate wraps around the surface of the support.

3. The method of claim 2, wherein the step S1 comprises sub-steps of:
   fixing one end of the flexible substrate on the surface of the support; and
   rotating the support to wrap the flexible substrate on the support.

4. The method of claim 3, wherein the flexible substrate comprises a first side and a second side, the first side of the flexible substrate is stretched and the second side is attached on the surface of the support, and the flexible substrate is wrapped around the support.

5. The method of claim 2, wherein an adhesive layer is formed on an exposed surface of the flexible substrate.

6. The method of claim 1, wherein the step S2 comprises sub-steps of:
   providing a carbon nanotube array formed on a substrate;
   pulling out a carbon nanotube film from the carbon nanotube array; and
   attaching one end of the carbon nanotube film on the flexible substrate, wherein the carbon nanotube film is kept stretched between the carbon nanotube array and the flexible substrate.

7. The method of claim 6, wherein the carbon nanotube array comprises a plurality of carbon nanotubes aligned in a same direction, and the aligned direction of the carbon nanotubes in the carbon nanotube array is substantially perpendicular with the substrate.

8. The method of claim 6, wherein the carbon nanotube film is pulled out by the steps of:
   selecting some of the carbon nanotubes having a predetermined width from the carbon nanotube array; and
   pulling the carbon nanotubes to obtain nanotube segments at uniform speed to achieve the carbon nanotube film.

9. The method of claim 6, wherein when attaching one end of the carbon nanotube film on the flexible substrate, the carbon nanotube film is suspended between the carbon nanotube array and the flexible substrate.

10. The method of claim 6, wherein after the one end of carbon nanotube film is attached on the flexible substrate, an angle defined by a surface of the carbon nanotube film and the aligned direction of the carbon nanotubes in the carbon nanotube array is in a range from about 60 degrees to about 90 degrees.

11. The method of claim 1, wherein in the step S3, the support rotates around its axis, and the carbon nanotube film is pulled out continuously from the carbon nanotube array and wraps around the support continuously.

12. The method of claim 11, wherein a rotating speed of the support is less than 15 m/s.

13. The method of claim 1, wherein an adhesive layer is formed on an exposed surface of the flexible substrate before the end of the carbon nanotube film is attached on the flexible substrate.

14. The method of claim 13, wherein a pressing force is applied on the carbon nanotube layer to fill the adhesive layer into the carbon nanotube layer.

15. The method of claim 13, wherein after the flexible substrate is separated from the support, the flexible substrate with the adhesive layer and the carbon nanotube layer thereon is solidified for about 10 minutes to about 20 minutes.

16. The method of claim 1, wherein in the step S4, the flexible substrate and the carbon nanotube layer are cut along a line substantially parallel with the axis of the support.

17. The method of claim 16, wherein the flexible substrate and the carbon nanotube layer are cut by a mechanical method or by an etching method.

18. The method of claim 1, wherein in the step S5, a plurality of wrinkles are formed in the carbon nanotube layer.

19. The method of claim 1, wherein each of the plurality of wrinkles has a linear structure and is oriented along a second direction, and the second direction is substantially perpendicular with the first direction.

20. The method of claim 1, wherein in the step S6, the carbon nanotube layer comprises a first end and a second end opposite with the first end, the carbon nanotubes in the carbon nanotube layer are substantially oriented from the first end to the second end, and the plurality of electrodes are electrically connected with the first end and the second end.

* * * * *